Jan. 3, 1933.  H. E. STONEBRAKER  1,893,043
GEAR CUTTING MECHANISM
Filed May 13, 1930
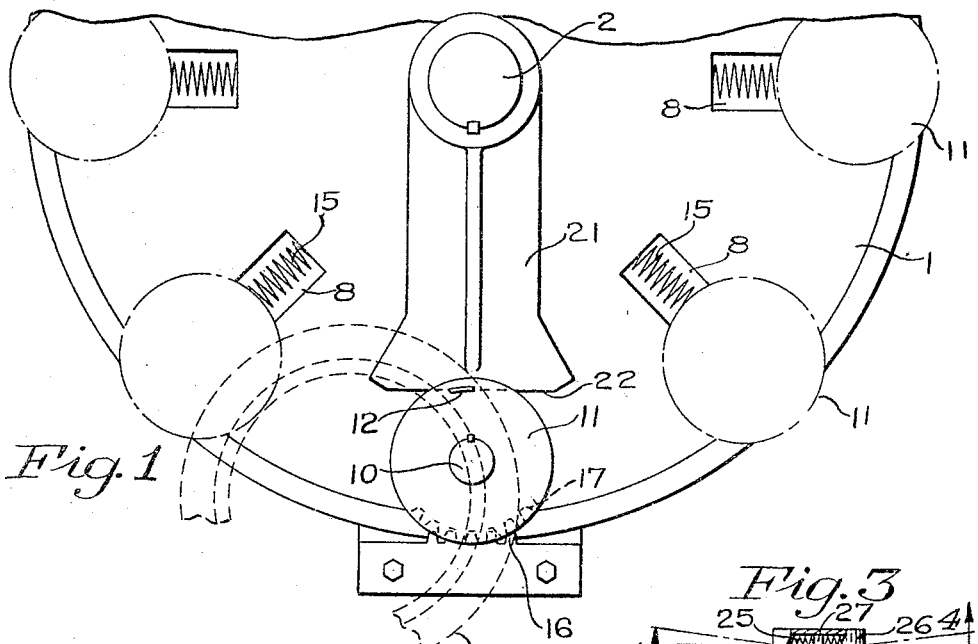
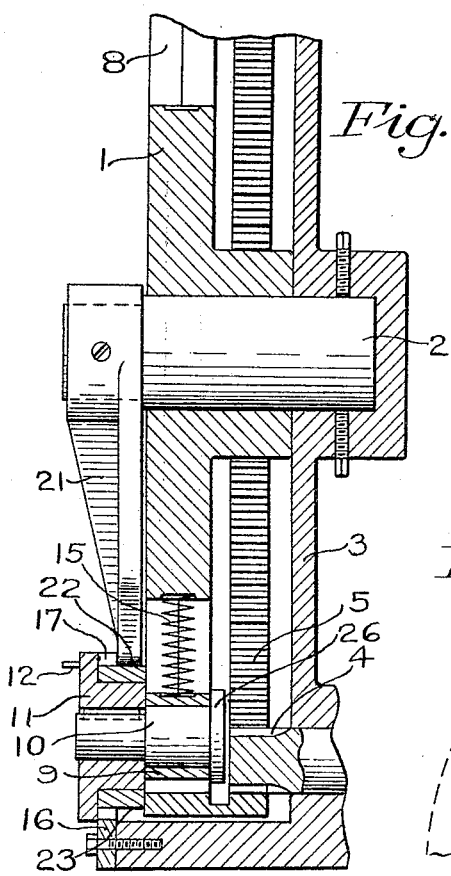
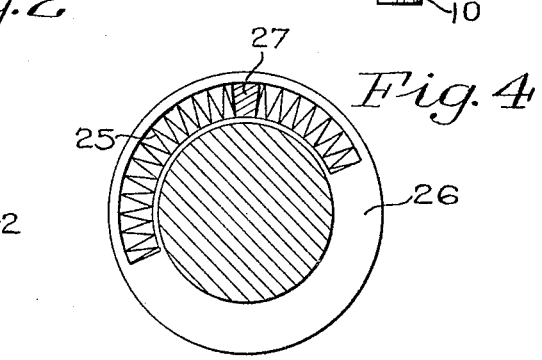
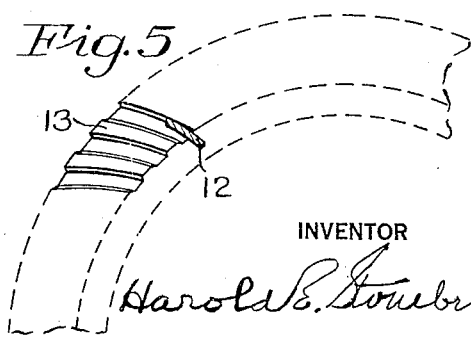
INVENTOR
Harold E. Stonebraker,

UNITED STATES PATENT OFFICE

HAROLD E. STONEBRAKER, OF ROCHESTER, NEW YORK, ASSIGNOR TO GLEASON WORKS, OF ROCHESTER, NEW YORK, A CORPORATION OF NEW YORK

GEAR CUTTING MECHANISM

Application filed May 13, 1930. Serial No. 452,001.

The invention relates to a gear cutting mechanism, and has for one of its objects to provide a movable carrier on which a series of tool holders are mounted, each tool holder being given a compound movement as it travels past the cutting point.

A further object of the invention is to afford a carrier having a continuous movement with a series of tool holders mounted thereon and adapted to be actuated during movement of the carrier so as to move the tools in a non-circular cutting path.

Another object of the invention is to provide a series of independently movable tools adapted to effect continuous cutting of a gear with lengthwise curved teeth.

An additional purpose of the invention is to afford a rotary carrier with tool holders mounted thereon for compound movements so that each tool may be adjusted upon its individual holder, eliminating the necessity of delicately adjusting a series of tools in fixed relationship on a carrier, as in the conventional type of face mill cutter.

Still another object of the invention is to afford a structure whereby a continuous cutting action can be had from a series of tools while operating each tool in a path of predetermined curvature, brought about by a compound movement of the tool holder.

Still a further purpose of the invention is to afford practical means for producing curved tooth gears by a continuous cutting action of a multiplicity of tools, the movement of each of which is controlled by the relative rolling action of a gear and rack.

To these and other ends, the invention consists in the construction and combination of parts that will appear from the following description when read in conjunction with the accompanying drawing, the novel features being pointed out in the claims following the description.

In the drawing:

Figure 1 is a partial side elevation, illustrating one form of the invention;

Figure 2 is a vertical sectional view taken centrally;

Figure 3 is a detail horizontal sectional view partially broken away;

Figure 4 is a vertical sectional view on line 4—4 of Figure 3, and

Figure 5 is a partial elevation of a portion of a gear face.

Referring more particularly to the drawing, in which like reference numerals refer to the same parts throughout the several views, 1 designates generally a carrier, shown in the form of a rotary disk-like member journalled on a bearing 2 which is suitably mounted on a fixed support 3. The carrier 1 may be of some other form or construction than that particularly shown, and in the illustrated embodiment, is driven by a pinion 4 from a suitable source of power which engages an internal gear 5 on the carrier 1.

The carrier is provided with a series of tool holders which are independently mounted and movable thereon, and to this end, it is provided with a series of radially disposed guideways 8. Mounted in each of said guideways 8 for radial movement is a block or bearing 9 that has mounted therein for rotational movement an arbor 10 to which is keyed a tool holder 11 having a suitable tool 12 secured thereto by conventional means and arranged to move across a gear face and cut a curved groove in the gear blank 13. The tool holder may be held in its outermost position with reference to the carrier and guideway 8 by means of a spring 15 or other suitable means. With the structure thus far described, each tool holder is permitted a bodily movement radially of the carrier as well as a rotational movement, and the mechanism will now be described by which movement of the tool holder is controlled to effect the desired action of the tool.

This is preferably brought about by fixed controlling means in the form of a gear element or toothed rack 16 permanently attached to the frame of the machine, and cooperating with another gear element preferably in the form of a pinion 17 that is fixed on the tool carrier. As the pinion 17 rolls on the rack 16, it imparts to the tool carrier a movement such as to cause the tool to travel in a curved path across the face of the gear blank.

This movement of the tool holder takes place as the carrier rotates to bring the gear 17 into engagement with and roll it over the rack 16, and during rotational movement of the tool holder, the latter accommodates itself to the rotating carrier by moving radially toward the center of the carrier against the action of the spring 15 which returns the tool holder to its outermost position after the gear 17 is moved out of engagement with the rack 16.

During the movement of the gear 17 on the rack 16, it is necessary to hold the tool carrier against the fixed rack, and to accomplish this there is provided a fixed guide 21 mounted on the bearing 2 and having a straight bottom surface 22 which engages the cylindrical surface 23 of the tool holder immediately back of the gear 17. In this fashion, as the tool is moved past the cutting point, the cylindrical surface 23 slides on the straight guiding surface 22, thereby holding the gear 17 in operating engagement with the fixed rack 16 and actuating the tool in the desired path while cutting. The path of travel of the cutting tool may be varied by changing the form of the fixed gear element or by otherwise imparting a varying compound movement to the tool holder.

After the tool holder has travelled past the cutting point, it may be returned to its initial position by any suitable mechanism, such for instance as springs 25 arranged in suitable pockets in the head 26 on the arbor 10 and on opposite sides of a fixed lug 27 carried by the block 9. By this means, positive rotation of the tool holder is permitted under the action of the gear and rack, while it is quickly restored to its normal position by the springs 25 that maintain the tool holder in its initial position during the rotation of the carrier, until it is again brought into cooperative relationship with the fixed operating rack.

The invention is not restricted to the precise form or arrangement of parts herein disclosed, and this application is intended to cover any modifications or departures coming within the intent of the improvement or the scope of the following claims.

I claim:

1. Gear cutting mechanism comprising a rotary carrier, a tool holder mounted on the carrier for radial bodily movement and rotational movement, a gear element fixedly connected to the tool holder, a stationary rack in the path of said gear element, and a stationary guide for cooperation with the tool holder to maintain said gear element engaged with the rack as it is moved past the same by the carrier.

2. Gear cutting mechanism comprising a rotary carrier having a radial guideway, a support movable in said guideway, a tool holder journalled for rotational movement in said support, a gear element fixedly connected to the tool holder, a rack in the path of said gear element, and guiding means cooperating with the tool holder to maintain said gear element engaged with the rack as the carrier moves the tool holder past the cutting point.

3. Gear cutting mechanism comprising a revoluble carrier, a tool holder rotatably mounted on said carrier and movable bodily thereon radially thereof, and stationary means arranged to cooperate with the tool holder when the carrier is turned to impart a compound movement to the tool holder in a non-circular curved path when the carrier moves the tool holder past the cutting point.

4. Gear cutting mechanism comprising a revoluble carrier, a plurality of tool holders revolubly mounted on said carrier and movable bodily thereon radially thereof, and stationary means arranged to successively cooperate with the tool holders when the carrier is turned to impart compound movements to the tool holders in non-circular curved paths when the carrier moves the tool holders past the cutting point.

5. Gear cutting mechanism comprising a revoluble carrier, a tool holder rotatably mounted on said carrier and movable bodily thereon radially thereof, means arranged to cooperate with the tool holder when the carrier is turned to impart a compound movement to the tool holder in a non-circular curved path when the carrier moves the tool holder past the cutting point, and resilient means for returning the tool holder to normal position on the carrier when disengaged from said cooperating means.

6. Gear cutting mechanism comprising a revoluble carrier, a tool holder rotatably mounted on said carrier and movable bodily thereon radially thereof, means arranged to cooperate with the tool holder when the carrier is turned to impart a compound movement to the tool holder in a non-circular curved path when the carrier moves the tool holder past the cutting point, and means for limiting the radial movement of the tool holder when it moves past the cutting point.

In witness whereof, I have hereunto signed my name.

HAROLD E. STONEBRAKER.